No. 634,275. Patented Oct. 3, 1899.
E. V. SCHENCK.
BOX FLANGE COUPLING FOR SHEET METAL PIPES.
(Application filed Mar. 16, 1899.)
(No Model.)
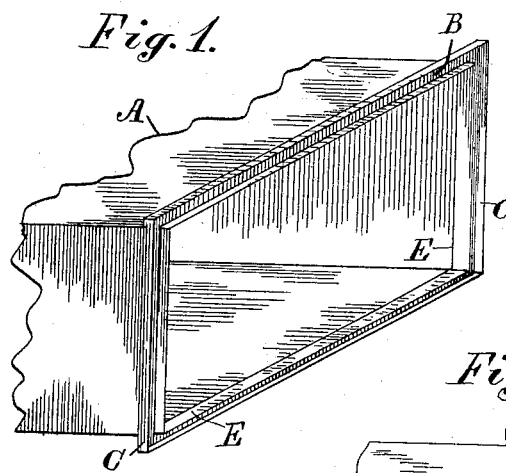
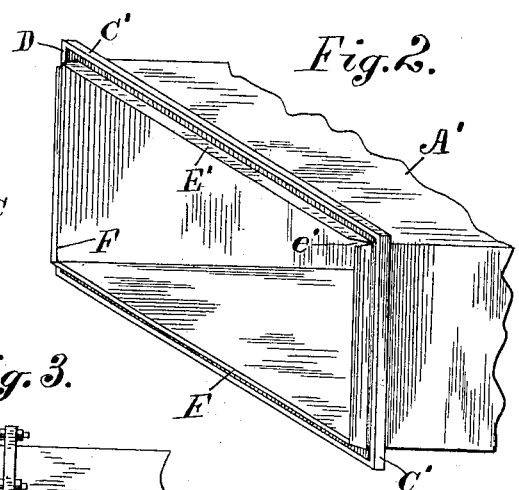
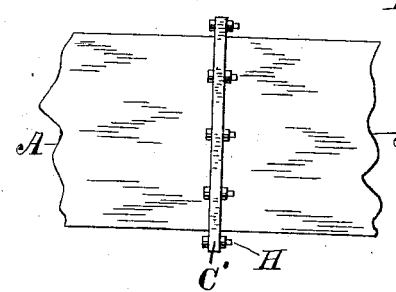
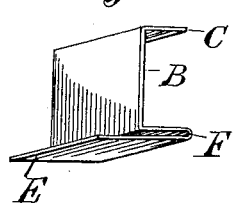
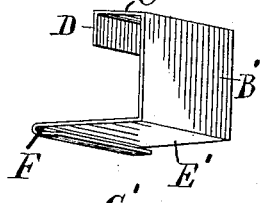
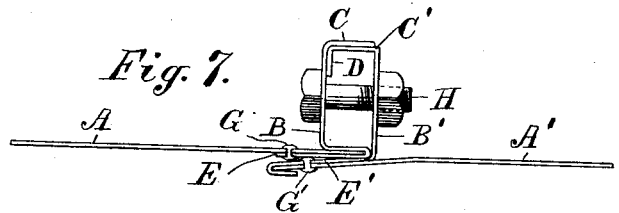
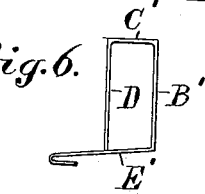
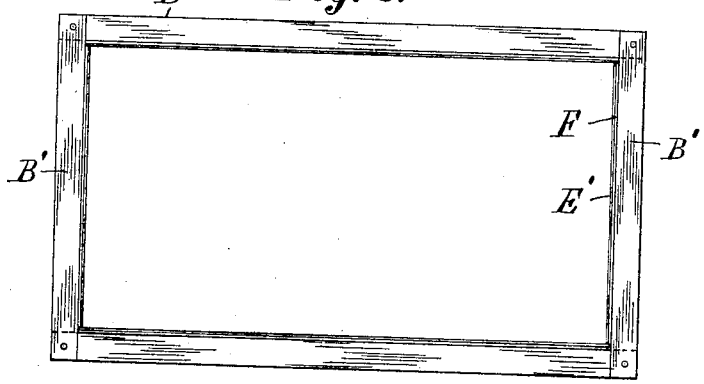
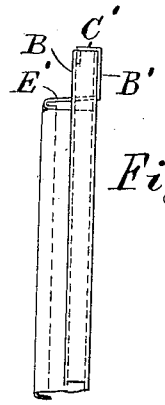
Attest:
Jacob Marx
Edw. F. Kinsey
Inventor.
Edward V. Schenck, per
Thomas S. Crane, Atty.
THE NORRIS PETERS CO., PHOTO-LITHO., WASHINGTON, D. C.

UNITED STATES PATENT OFFICE.

EDWARD V. SCHENCK, OF NEW YORK, N. Y.

BOX-FLANGE COUPLING FOR SHEET-METAL PIPES.

SPECIFICATION forming part of Letters Patent No. 634,275, dated October 3, 1899.

Application filed March 16, 1899. Serial No. 709,296. (No model.)

*To all whom it may concern:*

Be it known that I, EDWARD V. SCHENCK, a citizen of the United States, residing at New York, (Brooklyn,) county of Kings, State of New York, have invented certain new and useful Improvements in Box-Flange Couplings for Sheet-Metal Pipes, fully described and represented in the following specification and the accompanying drawings, forming a part of the same.

The object of the present invention is to furnish a coupling for angular sheet-metal pipes, such as are frequently used for air-ducts, and which when made of large dimensions are liable to bend at the joints unless artificially stiffened in some way. Heretofore such pipes have been coupled by mere flanges bolted or seamed together and which projected as ribs upon the surface of the pipe and served in some degree to stiffen the joint. Such flange-joint is not, however, as commonly constructed capable of resisting much external pressure, and large pipes have therefore required an external brace, which involves both expense and trouble to fix it in place.

In the present invention I provide the opposed ends of the pipes with sheet-metal members bent into such shape that when united together by bolts they form a hollow box-flange having very great rigidity. The construction is such that the box-flange has a stiffness and strength very much greater than can be secured by disposing the same amount of metal in any other shape. Such construction not only obviates the necessity of bracing the pipes internally, but it holds the joined ends of the pipes in close contact and forms a tighter joint than where either end of the pipe is liable to distortion.

The invention will be understood by reference to the annexed drawings, in which—

Figure 1 is a perspective view of one end of the pipe with a coupling member consisting of a projecting rib having a lateral wing; and Fig. 2 is a perspective view of another pipe end adapted to couple therewith, the coupling member having a projecting rib and a wing provided with an inwardly-turned flange. Fig. 3 is a side elevation of the pipe ends coupled together. Fig. 4 is a cross-section of the coupling member shown upon the pipe end in Fig. 1. Fig. 5 is a cross-section of the coupling member shown upon the pipe end in Fig. 2. Fig. 6 is an alternative construction for the members shown in Fig. 5. Fig. 7 is a cross-section of one side of the pipe adjacent to the joint, with the box-flange formed by bolting the coupling members together. Fig. 8 is an end view of one of the pipes, showing the junction of the corners in the coupling members; and Fig. 9 is an edge view of the same.

A and A' designate the opposed pipe ends, B the projecting rib in the coupling member upon A, and B' the corresponding rib upon the pipe A'. The ribs are provided, respectively, with wings C C', which project toward one another, and one of such wings is provided with an inwardly-projecting flange D, which may extend partly toward the pipe, as shown in Fig. 5, or entirely toward the pipe, as shown in Fig. 6. The members are provided, respectively, with feet E E', by which they are riveted upon the pipe ends, each foot having a return-bend to form a groove F, into which the end of the pipe is fitted, as is common in pipe-couplings of this class.

Fig. 7 shows the two members riveted to the respective pipes A and A' by rivets G and G'.

To avoid an interference between the rivets, the end of the pipe A' and the foot E' are bent inwardly, the corners of the pipe and the junction of such feet at the corners being suitably tapered to permit such inward flexure, as shown in Fig. 7. The beveling to form the taper is shown in Fig. 2.

Each coupling member for a rectangular pipe is made of four pieces, which are cut off from long lengths of so-called "shapes," which are conveniently made in lengths in cornice-making or sheet-metal-bending tools.

To make the coupling member rigid, the ribs B or B' of the four pieces are overlapped and bolted or riveted together, as shown at the corners of the coupling member B' E' in Fig. 8, the ends of the feet E' being cut away upon two of the members where they interfere with the junction, as shown at e' in Fig. 2. The ribs are provided with opposite bolt-holes to receive bolts H. The winged member, which possesses the inwardly-projecting flange D, fits within the wing C upon the opposed member, the foot E' fitting within the foot E in a corresponding manner and the ribs B B' being held rigidly apart by the edge of the wing C' and the flange D. The bolts draw the parts tightly together and form a rigid hollow box, as shown in Fig. 7, which possesses a double thickness of the metal in the wings C C' upon the outer side and in the feet E E' upon the inner side, so that the opposite edges of the box are greatly strengthened and prevented from rupture when the complete flange (shown in Fig. 3) is subjected to pressure. I have found that a hollow box-flange of this construction and one inch in height is capable of sustaining the weight of a man when extended across the flat side of a box two or three feet in width, and it thus serves not only to form a very stiff and permanent joint for the pipes, but to prevent damage to the pipes when exposed to accidental pressure.

It will be observed that the return-bend of the foot E is formed upon the same side of the rib B as the wing C and projects from the rib to the same extent as the wing C' extends from the rib B', so that when the parts are drawn together by bolts, as shown in Fig. 7, the bent end of the foot may come in contact with the rib B' at the same time that the wing C' contacts with the rib B, thus holding the ribs B and B' parallel with one another to brace the box-flange upon both its inner and outer sides.

It is obvious that the hollow box-flange may be secured by shapes other than those shown in the drawings, and I do not, therefore, limit myself to the precise construction herein described. It is also obvious that this class of flange may be applied to any angular pipe, and is therefore suited to one having three, five, or more sides, and in such case the ends of the shapes where they join at the several corners of the pipe may be lapped and secured together in the manner shown upon the square pipe in Fig. 8.

It will be observed that the rivets G G' both lie at one side (the left side in the drawings) of the hollow box-flange, which is necessitated with the construction shown by the fitting of the foot E over the foot E' to bring the return-bend upon the foot E in contact with the rib B', and I have therefore made special claim to this construction.

It will be understood that the two members may be somewhat reversed in their constructive features by forming the inwardly-projecting flange D upon the wing C of the member shown in Fig. 4 instead of upon the member shown in Fig. 5, in which case the foot E and the flange C would both of them fit inside of the foot E' and wing C' upon the opposite member.

Having thus set forth the nature of the invention, what is claimed herein is—

1. A coupling for sheet-metal pipes comprising members attached respectively to the opposed ends of the pipes and adapted to connect the pipes and form a rectangular hollow box to stiffen the joint.

2. A coupling for sheet-metal pipes comprising members attached respectively to the opposed ends of the pipes, and adapted to connect the pipes and form a rectangular hollow box to stiffen the joint, with contacting parts upon the opposite members to resist the clamping-pressure of bolts in the direction of the pipe.

3. A coupling for angular sheet-metal pipes comprising four sheet-metal shapes attached to the four sides of each of the pipes with their corners lapped and secured together, and constituting members adapted when coupled to form a hollow box-flange to stiffen the joint.

4. In a coupling for angular sheet-metal pipes, the sheet-metal shape having the foot E' for attachment to the pipe, the projecting rib B' having the lateral wing C' parallel with the foot, such wing being provided with the inwardly-projecting flange D to stiffen the wing, substantially as herein set forth.

5. In a coupling for angular sheet-metal pipes, the combination, with the member having the foot E', and the projecting rib having the wing provided with inwardly-turned flange, of the opposed member having the foot E, the projecting rib B and the plain wing adapted to embrace the flanged wing, the ribs and wings forming a hollow box to stiffen the joint, substantially as herein set forth.

6. In a coupling for angular sheet-metal pipes, the combination, with the member having the foot E', the projecting rib B' and the wing C', of an opposed member having the foot E with rib B and wing C, the rib B being adapted to contact with the rib C' upon the opposed member, and the foot E and rib B being connected by return-bend adapted simultaneously to contact with the rib B', to brace the box-flange upon both its inner and outer sides, substantially as herein set forth.

In testimony whereof I have hereunto set my hand in the presence of two subscribing witnesses.

EDWARD V. SCHENCK.

Witnesses:
L. LEE,
THOMAS S. CRANE.